US010674050B2

(12) United States Patent
Laroia et al.

(10) Patent No.: US 10,674,050 B2
(45) Date of Patent: Jun. 2, 2020

(54) METHODS AND APPARATUS FOR IMPLEMENTING AND USING CAMERA DEVICES

(71) Applicant: Light Labs Inc., Redwood City, CA (US)

(72) Inventors: Rajiv Laroia, Far Hills, NJ (US); Sapna A. Shroff, Sunnyvale, CA (US)

(73) Assignee: Light Labs Inc., Redwood City, CA (US)

( * ) Notice: Subject to any disclaimer, the term of this patent is extended or adjusted under 35 U.S.C. 154(b) by 32 days.

(21) Appl. No.: 16/006,540

(22) Filed: Jun. 12, 2018

(65) Prior Publication Data

US 2018/0359394 A1 Dec. 13, 2018

Related U.S. Application Data

(63) Continuation of application No. 14/977,203, filed on Dec. 21, 2015, now Pat. No. 9,998,638, which is a (Continued)

(51) Int. Cl.
*H04N 5/225* (2006.01)
*H04N 5/232* (2006.01)
*H04N 5/265* (2006.01)

(52) U.S. Cl.
CPC ......... *H04N 5/2252* (2013.01); *H04N 5/2253* (2013.01); *H04N 5/2254* (2013.01);
(Continued)

(58) Field of Classification Search
None
See application file for complete search history.

(56) References Cited

U.S. PATENT DOCUMENTS

2006/0187338 A1    8/2006   May et al.
2012/0149981 A1    6/2012   Khait et al.
(Continued)

FOREIGN PATENT DOCUMENTS

WO    2012153281 A1    11/2012

OTHER PUBLICATIONS

Supplementary European Search Report dated May 17, 2018, pp. 1-10.

*Primary Examiner* — Stephen P Coleman
(74) *Attorney, Agent, or Firm* — Straub & Straub; Michael P. Straub; Stephen T. Straub

(57) ABSTRACT

A camera device with a sensor which is mounted at an angle relative to a mounting surface or other reference surface is described. Camera modules, which include mirrors for light redirection, which are mounted at different angles in the camera device have sensors with different amounts of rotation. In some embodiments modules without mirrors use camera modules without rotated sensors while camera modules with mirrors may or may not use sensors which are rotated depending on the angle at which the modules are mounted in the camera device. By rotating the sensors of some camera modules rotation that maybe introduced by the angle at which a camera module is mounted can be offset. The images captured by different camera modules are combined in some embodiments without the need for computationally rotating an image thanks to the rotation of the sensor in the camera module used to capture the image.

20 Claims, 10 Drawing Sheets

Related U.S. Application Data continuation of application No. PCT/US2015/066532, filed on Dec. 17, 2015.

(60) Provisional application No. 62/238,046, filed on Oct. 6, 2015, provisional application No. 62/093,405, filed on Dec. 17, 2014.

(52) U.S. Cl.
CPC ......... *H04N 5/2257* (2013.01); *H04N 5/2258* (2013.01); *H04N 5/23238* (2013.01); *H04N 5/23296* (2013.01); *H04N 5/265* (2013.01)

(56) References Cited

U.S. PATENT DOCUMENTS

| | | | |
|---|---|---|---|
| 2013/0258044 A1 | 10/2013 | Betts-Lacroix | |
| 2013/0333843 A1* | 12/2013 | Kim | B29C 65/80 156/362 |
| 2015/0373269 A1* | 12/2015 | Osborne | H04N 5/23238 348/38 |

* cited by examiner

METHODS AND APPARATUS FOR IMPLEMENTING AND USING CAMERA DEVICES

RELATED APPLICATIONS

The present application is a continuation of U.S. patent application Ser. No. 14/977,203 filed on Dec. 21, 2015 which is related to U.S. Patent Application Ser. No. 62/093,405 filed on Dec. 17, 2014 and U.S. Patent Application Ser. No. 62/238,046 filed Oct. 6, 2015 with each of the applications being hereby expressly incorporated by reference in their entirety.

FIELD

The present application relates to camera device methods and apparatus and more particularly, a camera device with one or more sensors which are mounted at an angle relative to a reference edge or surface or a mounting surface and/or methods for using such a device.

BACKGROUND

Cameras often include a rectangular sensor which is used to capture one or more images. The sensor of a camera normally includes a rectangular sensor area with a bottom edge of the sensor area normally extending parallel to the bottom edge of the camera housing. The sensor maybe and often is mounted on a printed circuit board which also has its bottom edge extending parallel to the bottom of the camera.

While the conventional placement of a sensor with its bottom edge extending parallel to the bottom of a camera works well for many applications, such a configuration and arrangement of camera elements can limit camera design and/or the types of camera modules and/or their mounting arrangement.

It would be desirable from an implementation standpoint, due to space constraints and/or other reasons, to allow for camera modules to be mounted at a wide range of angles relative to the bottom of a camera in which the module or modules are mounted with different modules sometimes being mounted at different angles relative to the bottom of the camera device.

When mirrors are used and a camera module is mounted at an angle the portion of a scene area captured will be affected by the use of the mirror and angle at which the camera module is mounted. As a result of the use of the mirror and the camera mounting, a desired scene area maybe clipped if the conventional sensor mounting with the sensor being positioned having one of its edges parallel to the bottom of the camera housing was implemented.

In view of the above it should be appreciated that there is a need for new and improved configurations of camera components, e.g., optical chains and/or sensors mounted on mounting boards which facilitate the inclusion of multiple camera modules in a camera device potentially with different orientations relative to the bottom of the camera and potentially with one or more camera modules including mirrors.

SUMMARY

Various features of the present invention relate to sensor placement and/or use in a camera device. Various features and sensor mounting arrangements are well suited for use in a camera or a camera device that includes multiple optical chains, also sometimes referred to as camera modules, where individual camera modules normally include a separate sensor and different camera modules maybe mounted at different angles relative to the bottom of a camera device case in which multiple camera modules are mounted.

In various embodiments sensors are mounted on printed circuit boards (PCBs) at different angles taking into consideration the angles at which camera modules maybe mounted in a camera device. By mounting the sensors at different angles for different camera modules taking into consideration how the module will be mounted in a camera case, the flat bottom portion of the camera module can be easily secured to a mounting board in a camera and the camera modules can be positioned at the desired angle relative to the bottom of the mounting board which normally corresponds to the bottom of the camera case in which the mounting board and camera modules are mounted. Thus, while a variety of rectangular camera modules having mounting flat bottoms which are used as mounting bases maybe used, different camera modules may and sometimes will have sensors which are rotated relative to the bottom of the camera module to take into consideration the angle at which the camera module will be mounted to the mounting board of the camera.

Camera modules without mirrors may and sometimes are mounted with their sensor mounting boards extending parallel to the camera module mounting board of the camera to which the camera modules are secured. In such embodiments the back of the camera modules without mirrors maybe secured to the sensor mounting board with the optical axis of the camera module facing straight out through the front of the camera.

Camera modules with mirrors may and sometimes do have their sensors mounted perpendicular to the sensors of the camera modules without mirrors. While the sensors of camera modules with mirrors may and sometimes do extend in the back to front direction of the camera case in which the camera modules are mounted, the camera modules with mirrors maybe mounted at angles relative to the bottom of the camera case. The angle at which a sensor is mounted relative to a mounting surface, e.g., flat top or bottom surface of the camera module in which the sensor is included, in some embodiments is a function of the angle at which the camera module will be mounted relative to the bottom of the camera case in which the camera module is being mounted. In at least some such embodiments the mounting surface, e.g., top or bottom surface, of a camera module including a mirror is secured to the mounting board of the camera to which the front or back of a camera module which does not include a mirror is secured. As should be appreciated holes maybe included in the mounting board to allow light to pass in cases where the front or top of a camera module serves as the camera module mounting surface.

Various embodiments are particularly well suited to facilitate incorporating multiple, e.g. two, three or more, optical chains into a single camera device where physical space maybe limited and/or for technical reasons it may be desirable to have different optical chains oriented within the body of a camera device differently. The methods and apparatus where camera modules including mirrors maybe mounted at different angles relative to a side or bottom surface of a camera are described in various embodiments.

In some embodiments, an optical chain, e.g., camera module, includes one or more lenses and a sensor. In some embodiments the sensor is placed on a printed circuit board (PCB). The entire module or a portion of the module maybe enclosed in a housing. The components mounted in the housing of a camera module normally but not always include the sensor of a camera module and a printed circuit board (PCB) on which the sensor is mounted. The sensor and PCB are often mounted in a camera module housing, e.g., a rectangular housing having a flat mounting surface. The flat mounting surface of a camera modules in some embodiments is suitable for securing the camera module, e.g., using screws, adhesive or other fasteners, to a camera module mounting surface, e.g., an aluminum mounting board which maybe mounted inside a camera case or serves as the front or back of the camera.

The rectangular camera module housing is sometimes referred to as a camera body but this should not be confused with the camera case which often houses multiple camera modules in the case of a camera which includes multiple camera modules.

In some particular embodiments the camera module housing is rectangular with the body being longer than it is tall in some cases. In other embodiments the camera housing maybe square when viewed from the front.

In such implementations the camera module housing normally includes a flat reference surface that allows easy mounting of the one or more camera modules of the camera to some other surface of the camera body. The PCB onto which a camera sensor is mounted itself may be rectangular although other shapes, such as squares or ovals, are possible but with most PCBs used for mounting having at least one edge which is substantially straight. Having one or more straight edges to the PCB also enables easy mounting.

In some embodiments the top or base of a camera module used for mounting or orientation of the module maybe used as a reference surface. Alternatively the back of a camera module housing may serve as a reference surface.

The features of the present invention can be implemented and used in a single camera module. Thus a camera device may comprise one camera module. However, in various embodiments a camera device includes multiple different camera modules with at least some of the camera modules including mirrors and having sensors with different orientations. Thus in some embodiments a camera device may include a first camera module with a first mirror and a first sensor having a first orientation relative to the base of the first camera module and a second camera module with a second mirror and a second sensor, the second sensor having a different orientation relative to the mounting surface, e.g., base, the second camera module in which the second sensor is located. In addition to the first and second camera modules the camera device may also include camera modules without mirrors and which have sensors mounted so that the sensor and mounting board on which the sensor is located have the same orientation and with the mounting face of the camera module without the mirror corresponding to the back or front of the camera module rather than another face.

It should be appreciated that in some embodiments multiple camera modules of each type are included in a camera device. By using sets of camera modules with different sensor orientations and mirrors, a wide range of camera module mounting positions can be supported. Thus, camera modules with mirrors can easily be mounted at a wide range of angles relative to the bottom of the camera case, with the sensor orientation in the camera modules varying in a manner that corresponds to the camera module mounting angles that are used.

Numerous additional features and embodiments, and variations are discussed and described in the detailed description which follows.

DETAILED DESCRIPTION

Figure 1:
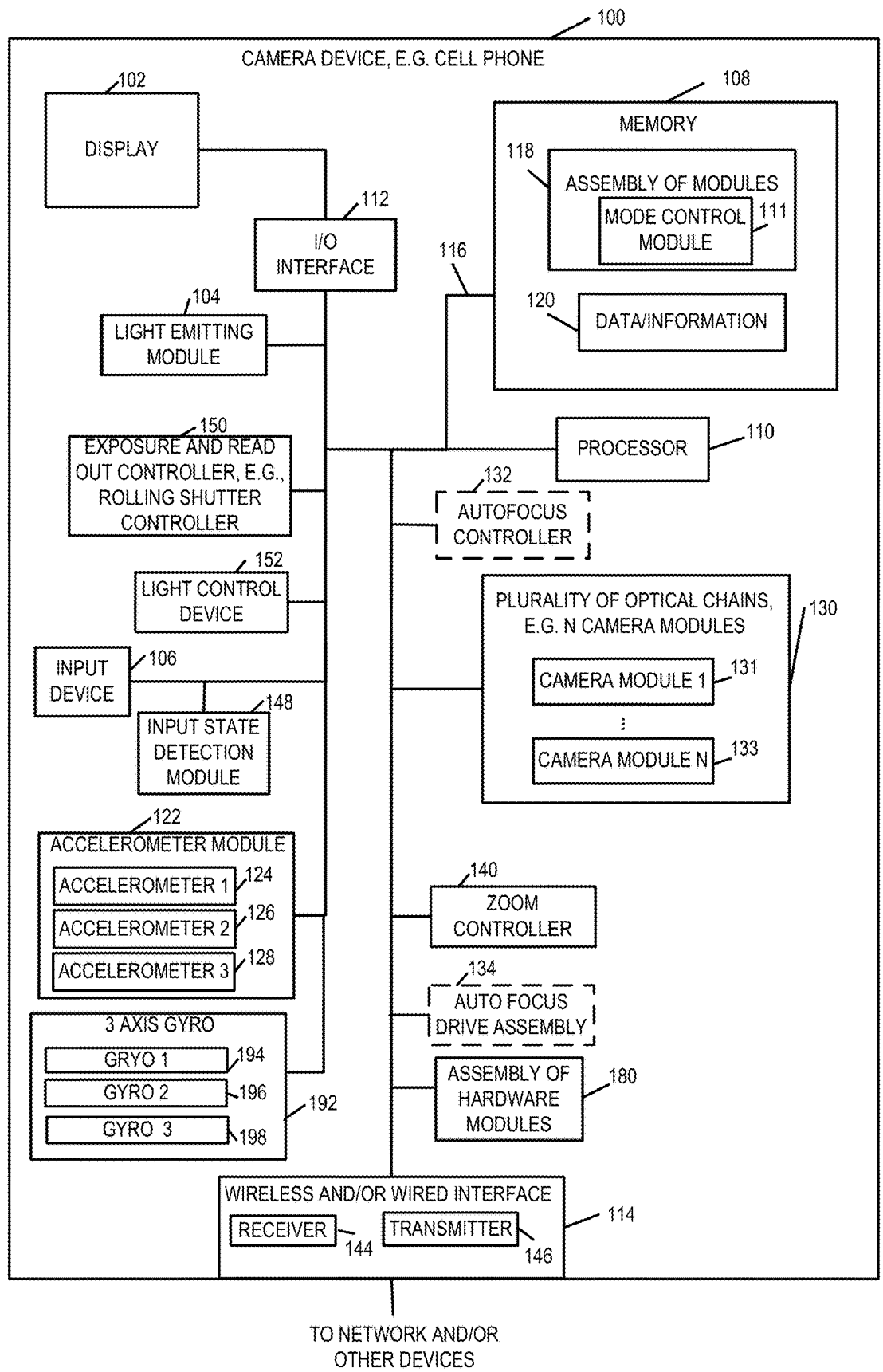
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. While the camera device 100 includes a plurality of camera modules 131, 133 depending on the embodiment the camera device maybe a single camera module 131 or 133.

However, to facilitate an appreciation of the invention and the benefits of using sensors with different orientations, e.g., rotated at different angles relative to a reference surface or edge, various features will be discussed in the context of an exemplary camera device in the form of a camera which includes multiple camera modules 131, 133.

The camera device 100, in some embodiments, is a portable device. In other embodiments, the camera device 100 is a fixed device such as a wall mounted camera. The camera device 100 includes multiple optical chains, e.g., camera modules, one or more of which have a rotated sensor in some embodiments with a sensor of another camera module being unrotated. As will be discussed below one or more of the camera modules 131, 133 may include a mirror. The camera modules 131, 133 are normally mounted to a mounting surface, e.g., rigid metal board which serves as a mounting board for one or more camera components. The mounting board may include holes allowing light to enter the lenses of one or more optical chains when the mounting board is located at the front of the camera 100.

FIG. 1 illustrates the camera device 100 in block diagram form showing the connections between various elements of the device 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a WIFI interface, and/or a USB interface, an I/O interface 112, an accelerometer module 122, 3 axis gyro 192, and a bus 116 which are mounted in a housing represented by the rectangular box touched by the line leading to reference number 800. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 800 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch sensitive screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. The display device maybe mounted in the back of a camera case which serves as a shell in which the camera components are mounted. Reference number 100 which is used to indicate the camera device can also be used to indicate the camera case since it is the case in which the other components shown in block form in FIG. 1 are mounted. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

Figure 9:
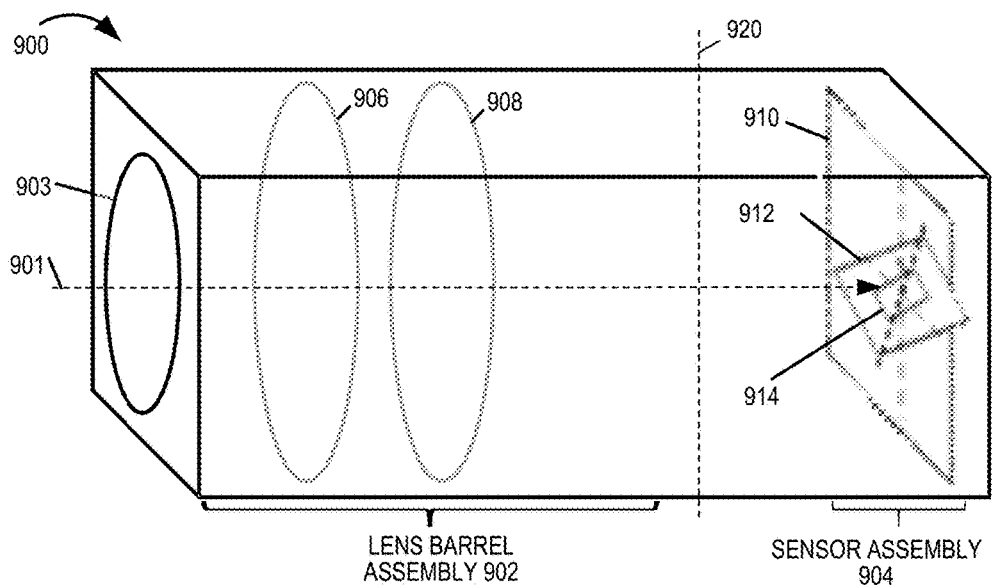
FIG. 9 illustrates an assembly of components used in an exemplary camera module, e.g., optical chain, which is used in a camera device in some embodiments.
Figure 10:
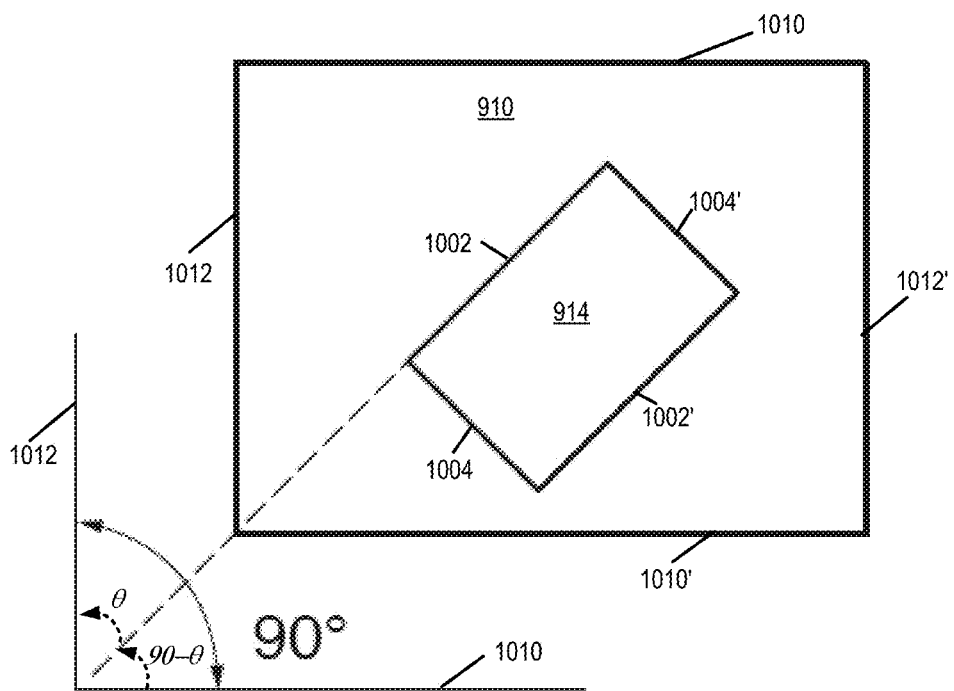
FIG. 10 is a drawing illustrating the alignment of the optically active area of an image sensor relative to a sensor mounting board.
Figure 11:
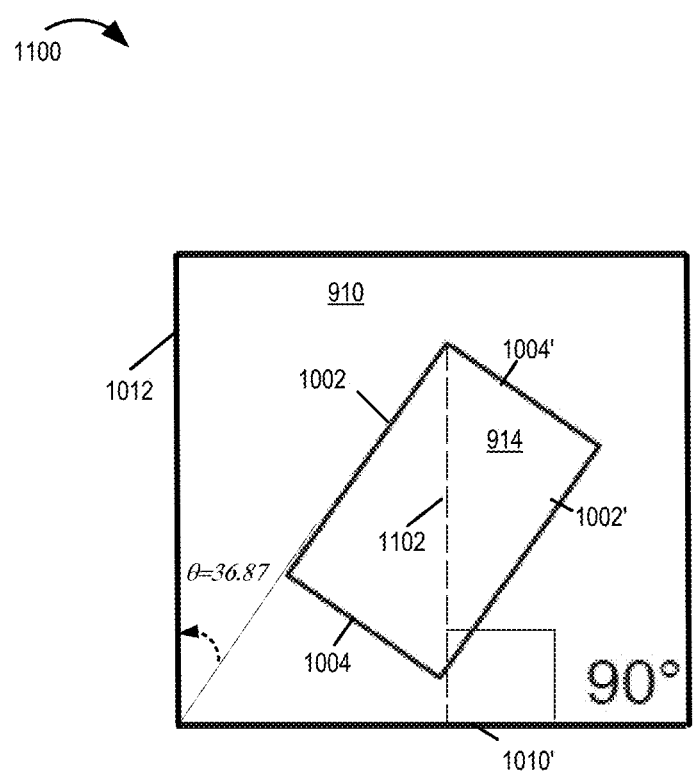
FIG. 11 illustrates a drawing showing the arrangement of an exemplary sensor on the sensor mounting board in one exemplary embodiment for a specific value of the angle "0" used in some embodiments.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera modules and/or arrangements described in the present application. For example, in some embodiments the camera device 100 is implemented using a set of camera modules with rotated sensors as shown in FIGS. 9-11. In some embodiments the camera device 100 is implemented uses the camera modules of the type shown in FIG. 3, with some camera modules having rotated sensor as shown and discussed further with regard to FIGS. 9-11 while other camera modules having unrotated sensor as shown and discussed further with regard to FIGS. 4-6. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. Some camera modules may include mirrors while other camera modules may not include mirrors as will be discussed further below with regard to FIG. 3. As will be discussed below, different camera modules may have different rotations or orientations with respect to the mounting surface of the individual camera module depending on the angle the individual camera module is mounted in the camera device 100. The camera device 100 is to be considered exemplary and a wide variety of different types of camera devices maybe implemented and use one or more features of the invention.

Images from different camera modules captured at the same time or during a given time period can be combined to generate a composite image, e.g., an image having better resolution, frequency content and/or light range than an individual image captured by a single one of the camera modules 131, 133. Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network. The interface 114 of the camera device 100 may be, and in some instances is, coupled to a computer so that image data may be processed on the external computer.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

While the outside opening of each camera module maybe protected by a lens having an optical power in some embodiments a flat piece of glass or plastic is used to cover the opening of a camera module having little or no concentrating or dispersing light ray characteristics. Such a flat piece of glass or plastic may have a zero or near zero optical power or light dispersion effects but will still be referred to as a lens for purposes of discussing the camera exemplary camera device.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments. While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target. The zoom control module 140 is configured to perform a zoom operation in response to user input.

The processor 110 controls operation of the camera device 100 to control the elements of the camera device 100 to implement the methods of the invention. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods of the present invention. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Figure 2:
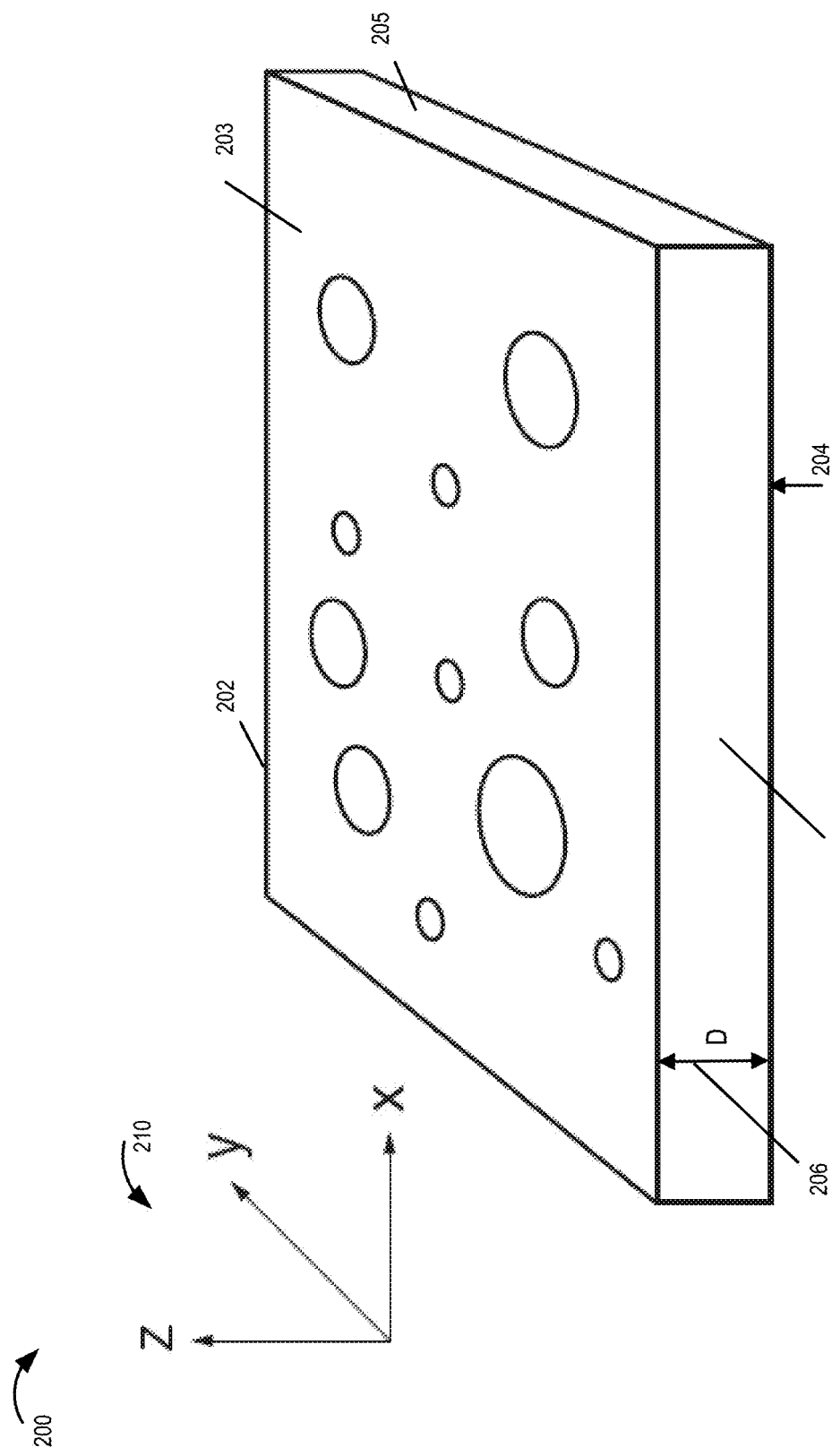
FIG. 2 illustrates a perspective view of an exemplary camera device which includes a plurality of the optical chains, e.g., camera modules.

FIG. 2 illustrates a perspective view 200 of an exemplary camera device 202 which includes a plurality of the optical chains, e.g., camera modules. The camera device 202 maybe the same or similar to the camera device 100 shown in FIG. 1. The front 203 of the camera 202 can be seen to include a plurality of openings (represented by a circle for simplicity) via which light enters the camera modules and proceeds along the camera modules to the corresponding image sensors in the camera modules. The front 203 of the camera can server as a mounting board to which optical modules can be secured. Alternatively a camera module mounting board maybe positioned behind the face 203 of the camera module or at the back of the camera. In one such embodiment the camera modules are secured to a mounting modules positioned parallel to and behind the front 203 of the camera device 202. Reference number 205 is used to refer to the case of the camera device 202 which may include the front portion 203 as well as a back, bottom 207, top and sides. The display maybe mounted in the back of the case 205 and is thus not visible in FIG. 2. a Larger circles correspond to optical chains with larger apertures and focal lengths. The number of openings shown in the figures corresponding to the optical chains is merely exemplary. Drawing 210 shows X-Y-Z axis to provide a perspective of the layout of the camera 202 and to facilitate better understanding of the discussion which follows. The depth "D" 206, represents the thickness of the camera 202 from the front surface 203 of the camera to the back/rear surface 204 of the camera, extends along what is identified in the figure as the Z-axis. While not shown in FIG. 2, it should be appreciated that camera device 202 may and in some embodiments does include the same or similar elements as camera device 100 of FIG. 1. Thus it should be appreciated that camera device 202 includes various elements such as the processor 110, memory 108, zoom controller 140, exposure and read out controller 1, accelerometer, gyro, autofocus controller etc., and various other elements discussed above with regard to camera devices 100.

As discussed above, the exemplary camera device may include a plurality of different camera modules mounted at different angles relative to a reference surface such as the mounting board on which the modules are mounted or the bottom of the camera device in which the camera modules are included.

Figure 3:
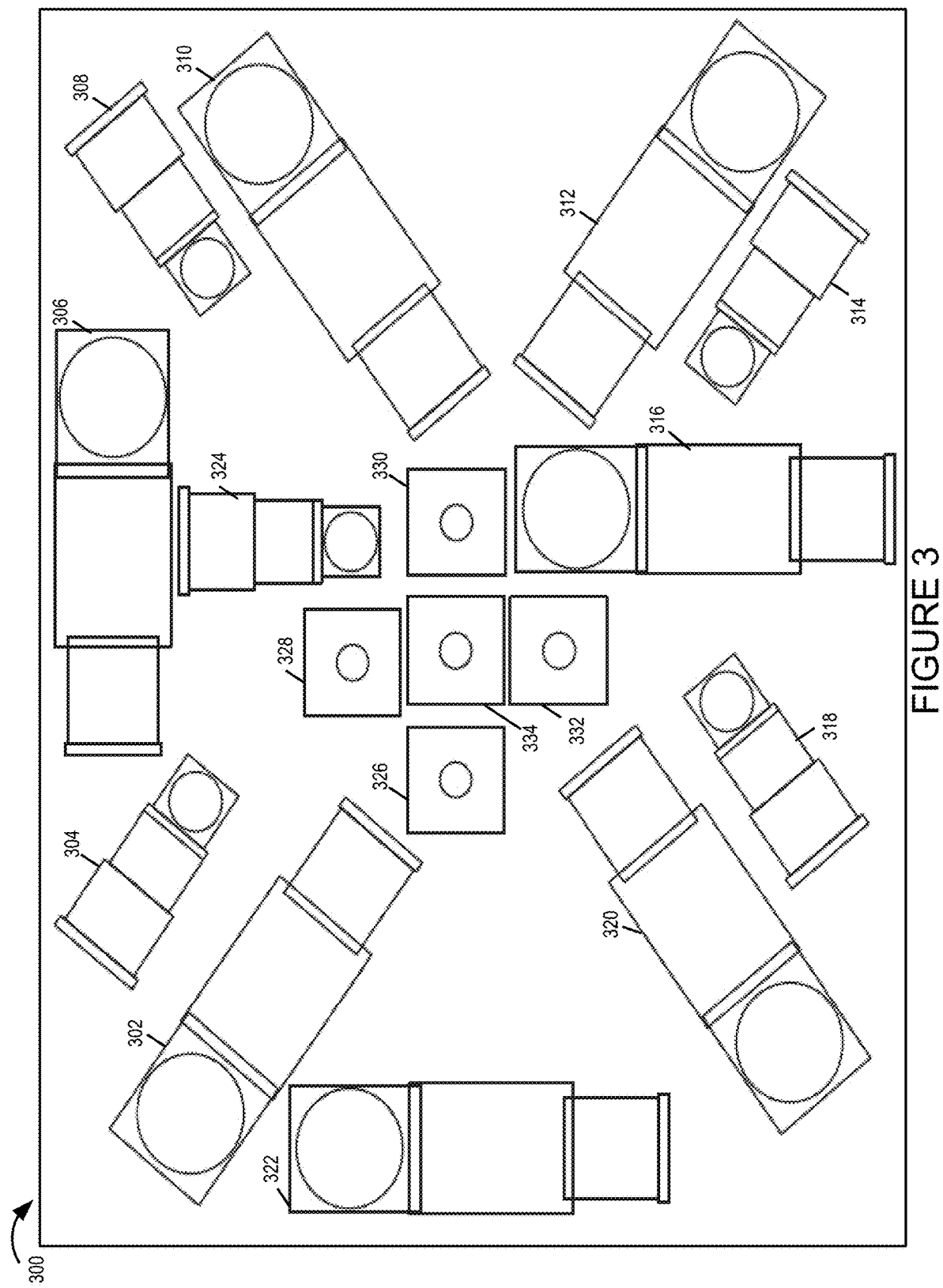
FIG. 3 illustrates an arrangement of optical chains, e.g., camera modules, used in one embodiment to implement a camera device in accordance with some embodiments.

FIG. 3 is a diagram 300 showing an arrangement of optical chains, e.g., camera modules, within the body of an exemplary camera device 300. The camera device can be the same or similar to the camera devices 100, 202 shown in FIGS. 1 and 2. In the illustrated example of FIG. 3 there are 17 camera modules arranged in the depicted manner. Camera modules 328, 326, 332, 334, 330 which appear square in shape in FIG. 3 do not include mirrors and have optical chains which face straight out the face of the camera 300. The sensor mounting board of such optical chains is mounted in the same plane and with the same general orientation as the back of the camera device. Thus, the sensors of modules 328, 326, 332, 334, 330 are not rotated relative to the sensor mounting boards on which they are mounted and the back or front of these modules is secured to a module mounting surface which extends parallel to the face of the camera. The other optical chains such as optical chains 302, 320, 322, 304, etc. include mirrors. Such modules have sensor mounting boards which extend in the Z dimension. Thus while the sensor mounting board of camera module 328 which does not include a mirror extends left to right and top to bottom in the camera device 300, the sensor mounting board of camera module 302 will extend from the back to front of the camera and along a diagonal as viewed from front of the camera. Modules with mirrors will receive light through the front of the camera and then redirect the light within the body of the camera device towards the sensor of the module. Thus light entering a module with a mirror will be directed sideways, e.g., on a diagonal, or towards the top or bottom of the camera device before hitting the optical sensor of the module onto which the light is directed by the module's mirror. Thus the mirrors allow a portion of the optical axis to extend at a right angle or another angle with respect to the face of the camera before hitting the corresponding sensor.

The seven optical chains 302, 306, 310, 33, 316 320, 322 have the largest lenses and largest supported focal lengths. Similarly, the five camera modules 304, 308, 314, 318, 324 have the medium diameter lenses and medium supported focal lengths. The five optical chains 326, 328, 330, 332 and 334 having the smallest diameter outer openings, e.g., light entrance openings, and smallest focal lengths are implemented using optical chains which do not use mirrors and extend straight toward the back of the camera. Optical chains which do not include mirror assemblies may be used for the optical chains 326, 328, 330, 332 and 334. From the FIG. 3 example which may be considered as a frontal view with the front of the camera housing removed to allow viewing of the camera modules, it can be seen how a larger number of camera modules can be incorporated into a single camera device allowing for the simultaneous and/or synchronized capture of multiple images of the same or different portions of a scene area using a single camera. The camera device can then combine multiple images to generate a composite image having image attributes and/or qualities such as a number of pixels which exceeds that possible using a single one of the camera modules of the camera 202.

Figure 4:
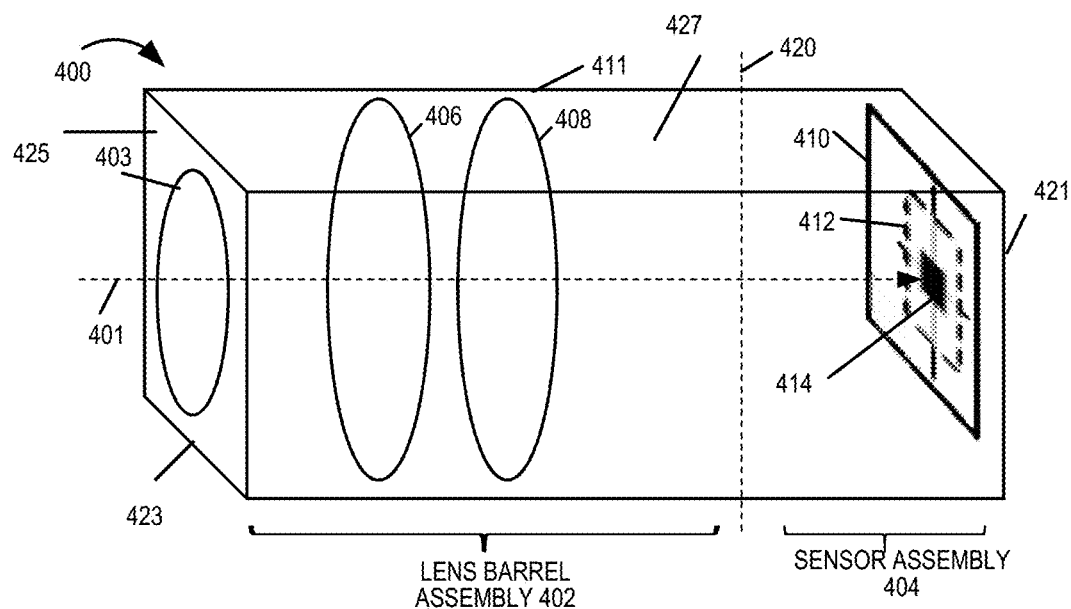
FIG. 4 illustrates an assembly of components used in an exemplary camera module, e.g., optical chain, which is used in a camera device in some embodiments.

FIG. 4 illustrates an assembly 400 of components used in an exemplary camera module, e.g., optical chain, which is used in a camera device in some embodiments. The optical axis 401 extends from the front of the camera module 400 to the back of the module where sensor 412 is located. The assembly 400 may be used as part of at least some of the camera modules shown in FIG. 3, e.g., such as for camera modules 326, 328, 330, 332, 334. The optical chains 326, 328, 330, 332, 334 do not include mirror/mirror assemblies and thus the assembly 400 can simply be used as any one of these camera modules itself. The assembly 400 includes a housing 411, having at least one flat surface suitable for use as a camera module mounting surface. In the FIG. 4 example, the camera module does not include a mirror and the camera module 400 includes a flat front surface and a flat rear surface 421 which are well suited and sued in some embodiments to mount the camera module 400 to a camera module mounting board. The camera module also includes flat sides and a flat top 427 and flat bottom 423. The module 400 also includes a lens barrel assembly 402 and a sensor assembly 404 which maybe and sometimes are included in the hosing 411. The walls of the housing 411 may serve as the walls of the sensor assembly 404. Line 420 illustrates where the lens barrel assembly stops and the sensor assembly 404 starts. The two parts of the assembly 400 i.e., barrel assembly 402 and sensor assembly 404 may be coupled together when used in a camera module as will be discussed. The lens barrel assembly 402 includes an opening 403 via which the light rays pass through, travel along the lens barrel assembly and reach the filter and sensor assembly 404. Reference 401 indicates the optical axis of the camera module where the assembly 400 is used. The lens barrel assembly 402 further includes one or more lenses, e.g., such as the two lenses 406, 408 shown for simplicity, via which the light rays traverse prior to reaching the sensor assembly 404. While not shown in the figure the assembly 400 may also include one or more filters prior to or included within the sensor assembly 404. The sensor assembly 404 includes a sensor mounting board/printed circuit board (PCB) 410, has a sensor area 412, which corresponds to a sensor die, that is aligned along the PCB or flat reference surface, e.g., the base of the sensor mounting board 410. The rectangular area 414 represents the optically active area of the sensor 412. The camera module 400 may be and sometimes is used as one of the camera modules 326, 328, 334, 332, 330 of the camera shown in FIG. 3 with the back 421 of the camera module housing being mounted in a plane parallel to the back of the camera device 300 and with the sensor being positioned parallel to the back of the camera in which the module 400 is located. However, the front 425 of the camera module 400 could instead be mounted to the camera module mounting board, e.g., 202 which serves as the face of the camera or is behind the face of the camera. However, other configurations are possible. An exemplary arrangement and alignment of the optically active image sensing area 414 of the sensor 412 with reference to the PCB 410 or a flat reference surface is illustrated in further detail in FIGS. 5-6. As shown in the figure, the optically active area 414 of the sensor is oriented along the sides of the PCB 410 such that the longer sides of the rectangular sensor area 414 are parallel to the edges of the PCB board on which the sensor is mounted.

Figure 5:
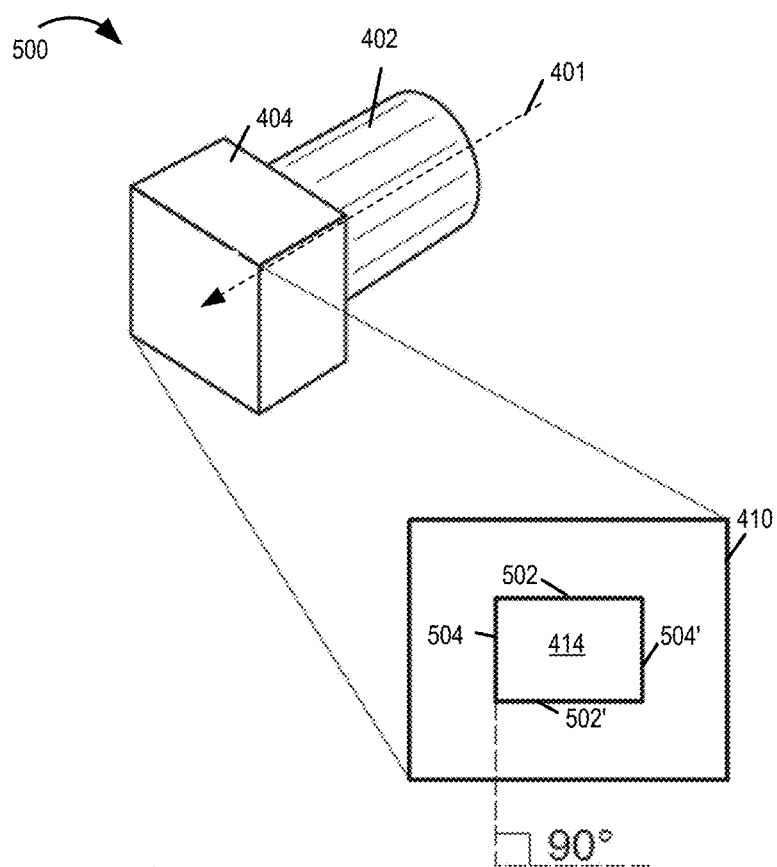
FIG. 5 illustrates a drawing showing a perspective view of the assembly shown in FIG. 4 and a sensor assembly in more detail.

FIG. 5 illustrates a drawing 500 showing a perspective view of the camera module 400 from the outside, e.g., exemplary external view without the full camera module housing 411 being shown. The portion of the camera module housing 411 corresponding to the sensor assembly 404 is shown in FIG. 5 as the rectangular area identified by reference 404 since the sensor assembly is inside this portion of the camera housing 411. The optical axis 401 shows the path of the light which passes through the barrel assembly 402 prior to reaching the sensor assembly 404.

Drawing 500 further shows the alignment of the optically active area 414 of the image sensor relative to the sensor mounting board 410 of the camera module 400. The optically active area of the sensor 414 is a rectangle with two longer sides 502, 502' and two short sides 504, 504'. It can be appreciated from the figure that the optically active area of the sensor 414 is aligned such that the longer sides 502, 502' of the optically active area of the sensor 414 are perpendicular to the base of the mounting board. The sensor 412 has the same orientation as the mounting board on which it is mounted and is not rotated with regard to the bottom of the mounting board.

Figure 6:
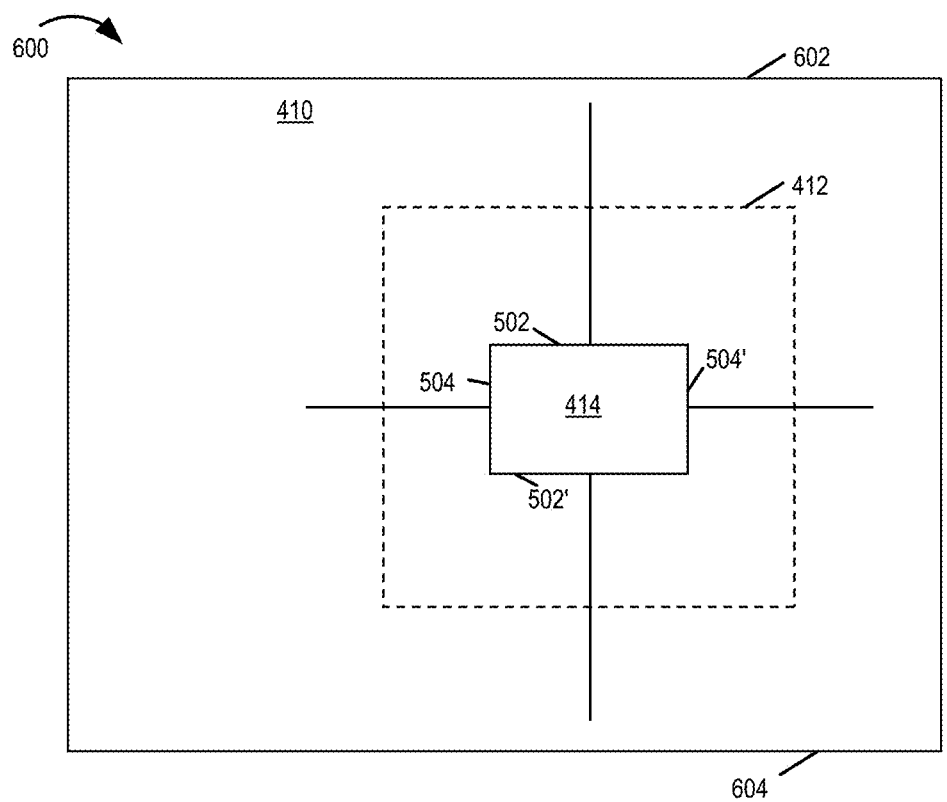
FIG. 6 illustrates a drawing showing the arrangement of an exemplary sensor on a sensor mounting board in greater detail.

FIG. 6 illustrates a drawing 600 showing the arrangement of an exemplary sensor 412 on a sensor mounting board 410 in greater detail. The drawing 600 shows the sensor mounting board 410, the sensor area 412 (sensor die) and the optically active area 414 of the sensor as well as their alignment with respect to each other in more detail. While the sensor 412 is shown as a square, it should be appreciated that the sensor area 412 maybe, and in many cases is, rectangular.

In the FIG. 6 diagram which corresponds to the non-rotated sensor configuration used in module 400, the top and bottom (base) sides of the mounting board are indicated by reference numbers 602 and 604 respectively. As discussed above with regard to FIGS. 4-5, the optically active area 414 of the sensor is oriented along the sides of the PCB 410 such that the longer sides 502, 502' of the optically active portion 414 are parallel to the base 604 of the mounting board 410 on which the sensor is mounted.

While the sensor arrangement shown in FIG. 4 is suitable for camera modules such as modules 326, 328 which have camera modules which are not rotated or arranged on a diagonal relative to the bottom of the camera device 300, such a configuration where the sensor is mounted in a manner that its edges are parallel to the edges of the PC board on which the sensor is mounted may not be suitable for embodiments where the camera modules are mounted on angles relative to the bottom of the camera device.

This is because if the sensor orientation/alignment shown in FIGS. 4-6 is used in camera modules mounted on a diagonal such as camera modules 320, 318, 302, 302 some portion of a scene of interest may be lost, e.g., cut off, in an image captured by these camera modules since these camera modules have a rotational offset as compared to camera modules with sensors that have a bottom edge parallel to the bottom of the camera.

While mounting camera modules on angles such as shown in FIG. 3 has numerous advantages and benefits relating to zooming and other functions, in some embodiments an image captured by at least some of the camera modules with rotational offset may fail to captures portions of a scene of interest due to light from the scene of interest missing the active area of the sensor due to the sensor's rotational offset.

Figure 7:
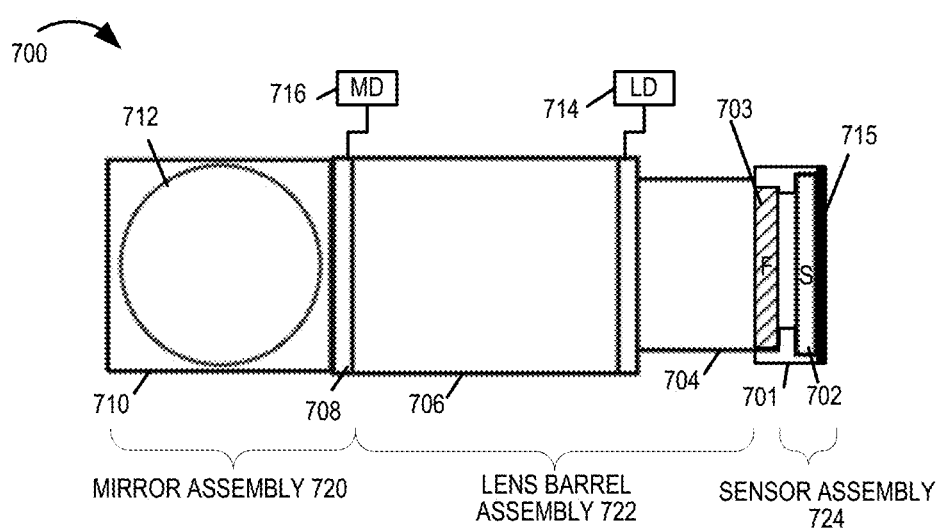
FIG. 7 shows an optical chain, e.g., camera module, which is used in various exemplary embodiments.

FIG. 7 shows an optical chain, e.g., camera module, 700 which is used in various exemplary embodiments. A plurality of optical chains of the type illustrated in FIG. 7 are used in a camera device such as the camera 202. For example the optical chain 700 may be used as any of the camera modules 302, 304, 306, 308, 310, 312, 314, 316, 318, 320, 322 and 324. The camera module 700 is an optical chain that includes an assembly of different elements integrated together to form the camera module. As illustrated, camera module 700 includes a mirror assembly 720, an optical lens assembly 722 (also referred to as lens barrel assembly since it may include multiple lens included in a moveable lens barrel) and a sensor assembly 724. The mirror assembly 720 of the camera module 700 includes an outer opening 712 which maybe covered by a flat glass/plastic plate, a light redirection device, e.g., mirror, 710 positioned behind the opening 712, and a mirror hinge 708. The mirror hinge 708 is coupled to the mirror drive (MD) 716. The optical elements assembly 722 of the camera module 700 includes a first cylindrical module portion 706 and a second cylindrical module portion 704, with the optical elements assembly 722 being coupled to a lens drive 714. The sensor assembly 724 of the camera module 500 is preceded by or include as part of the assembly 724, a filter 703 mounted on a filter mount 701. The sensor assembly 724 further includes a sensor 702 placed on a sensor mounting board 715. The sensor mounting board maybe and sometimes is a printed circuit board with electrical connections and/or a flex tape which can be used to connect the sensor mounted on the board to the processor of the camera device in which the camera module 700 is mounted. Camera module 700 maybe used as any one of the camera modules of FIG. 3 which include a mirror. Light enters the optical chain 700 via the opening 712 and is redirected by the mirror 710 so that it reaches the sensor 702 at the back of the optical chain. The first and second cylindrical portions 704, 706 can house one or more lenses and in some cases filters as well as other optical components through which light may pass before reaching the sensor 702. While the mirror 710 is normally used to redirect light 90 degrees or approximately 90 degrees so that light entering through the opening 712 (which may be positioned on the face of the camera) along it's optical axis will be redirected along the optical axis of the optical chain 700 so that is travels towards the side of the camera allowing for the optical chain 700 to effectively use the side to side distance of the camera device in which the optical chain 700 is mounted, the mirror drive 716 may move the position of the hinge 708 and thus the mirror 710 to alter the angle of redirection so that it varies from 90 degrees. Thus, the direction in which the optical chain 700 effectively points may be altered by moving all or a portion of the hinge 708 and mirror 710. In some embodiments, the opening 712 is covered with a plane piece of glass with no optical power which as noted above maybe referred to as an outer lens even though it has little or no optical power. The MD 716 may be implemented using a motor or other mechanical mechanisms which can be used to drive or change the position of the mirror 710 and/or hinge 708 which connects the mirror to the other components of the camera module such as cylindrical portion 706. The cylindrical or barrel portions 704, 706 of the optical elements assembly 722 may be moved by lens drive 714 so that they slide relative to each other, e.g., barrel portion 704 may be moved so that it moves further into or out of the barrel portion 706 thereby altering the distance from the opening 712 to the sensor 702 as part of a focus or zoom operation. It should be appreciated that the optical chain 700 allows for relatively long optical chains to be positioned in a camera device which has a depth which is less than the overall length of the optical chain 700. The camera module 700 is particular well suited for implementing camera devices which include multiple optical chains but which are still intended to be relatively thin to facilitate storage in a pocket or other storage device.

Figure 8:
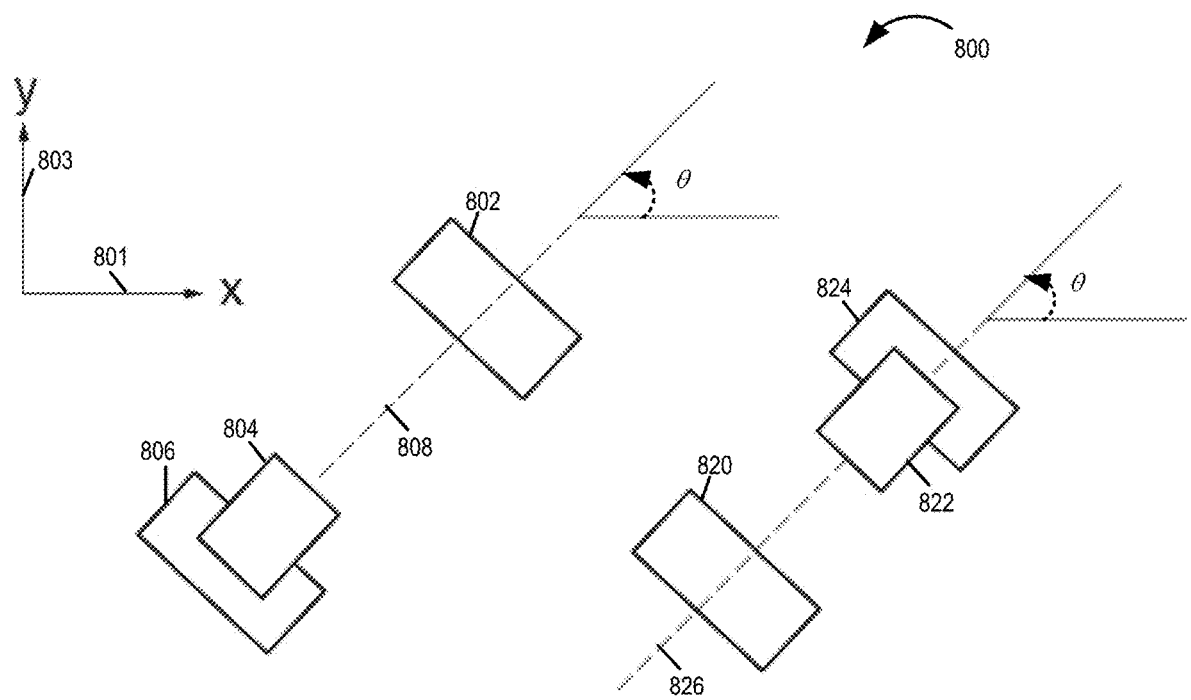
FIG. 8 is a drawing illustrating the arrangement of two exemplary camera modules in an exemplary camera device.

FIG. 8 is a drawing 800 illustrating the arrangement of two different exemplary camera modules in the exemplary camera device 202 in an X-Y plane. The first camera module includes and/or corresponds to a mirror assembly 802, lens barrel assembly 806 and sensor assembly 806 with the line 808 indicating the optical axis of the first camera module. The second camera module includes and/or corresponds to a mirror assembly 820, lens barrel assembly 822 and sensor assembly 824 with the line 826 indicating the optical axis of the second camera module. The lens barrel housing is not shown in FIG. 8 but each of the first and second camera modules would also have a housing including a flat mounting surface which would correspond to the bottom or top of the sensor assemblies 806, 824 with the bottom being used as the mounting surface if the camera modules were mounted to a board at the back of the camera and the top being used as the mounting surface in some embodiments if the camera modules were mounted to a mounting board located on the front side of the camera. The first camera module may correspond to, for example, camera modules 310 or 318 of FIG. 3 and the second camera module may correspond to, for example, camera modules 320 or 308 of FIG. 3. The angle (θ) of the optical axes of the first and second camera modules with respect to the X-axis 801 (X axis 801 and Y axis 803 is shown to facilitate an understanding of the orientation of the camera modules.

FIG. 9 illustrates an assembly 900 of components used in an exemplary camera module, e.g., optical chain, which is used in a camera device in some embodiments can include a sensor which is rotated relative to a printed circuit board on which the sensor is mounted and also relative to the bottom and/or top flat mounting surfaces of the camera module will often correspond to the top and bottom of the printed circuit board on which the sensor is mounted. The assembly shown in FIG. 9 and in some embodiment is used as components of the camera module shown in FIG. 7 with the lens barrel assembly 902 being used in place of the lens barely assembly 702 and with the sensor assembly 904 being used in place of the sensor assembly 704. Thus in some embodiments a camera module is implemented with a mirror assembly 720 preceding the lens barrel assembly 902 and sensor assembly 904.

Thus it should be appreciated that FIG. 9 does not show the mirror portion of the camera module for simplicity but it should be appreciated that when a module includes a mirror, the mirror would be in addition to the components shown in FIG. 9. For example mirror 802 or 820 would be included as part of the camera module in addition to the lens barrel assembly 902 and sensor assembly 904.

The assembly 900 may be used as part of at least some of the camera modules shown in FIG. 3, e.g., such as camera modules 302, 304, 308, 310, 312, 314, 318, and 320. The assembly 900 includes a lens barrel assembly 902 part and a sensor assembly 404 part which are shown separated by line 920 in the figure. The two parts of the assembly 900 i.e., barrel assembly 902 and sensor assembly 904 may be coupled together when used in a camera module as shown and discussed with regard to camera module 700 of FIG. 7. The lens barrel assembly 902 includes an opening 903 via which the light rays pass through, travel along the lens barrel assembly and reach the filter and sensor assembly 904.

Reference 901 indicates the optical axis of the camera module where the assembly 900 is used. The lens barrel assembly 902 further includes one or more lenses, e.g., such as the two lenses 906, 908 shown for simplicity, via which the light rays traverse prior to reaching the sensor assembly 904. While not shown in the figure the assembly 900 may also include one or more filters prior to or included within the sensor assembly 904. The sensor assembly 904 includes a sensor mounting board/printed circuit board (PCB) 910, has a sensor area 912, which corresponds to a sensor die, that is aligned along the PCB or flat reference surface, e.g., the base of the sensor mounting board 910. The rectangular area 914 represents the optically active area of the sensor 912. An exemplary arrangement and alignment of the optically active image sensing area 914 of the sensor 912 with reference to the base of the sensor mounting board 910 is shown (and illustrated in further more detail in FIGS. 10-11). As shown in FIG. 9, the optically active area 914 of the sensor is oriented at an angle with respect to the base of sensor mounting board 910. Such an exemplary configuration of the camera module with the sensor optically active area 914 being rotated at an angle with respect to the base of the sensor mounting board 910 allows for improved image capture of a scene area of interest without loosing portions of the scene area of interest while still allowing the camera module to be mounted using the flat surface of the camera module housing.

The rotated sensor arrangement such as illustrated in FIG. 9, is done in accordance with the features of present invention, in such a way as to counteract or avoid the rotational offsets that would otherwise be introduced into a capture image by anticipating the offset that will occur when the camera module is installed on a mounting board in a camera case and used to capture an image, e.g., at the same time other modules capture an image of the scene area. The rotational offset of the sensor within the camera module compensates for the rotation offset which will be introduced during image capture a priori as a result of the rotated sensor design thereby reducing or avoiding the need to compensate for such an offset after image capture, e.g., at the time a composite image is to be generated from images captured by different modules of the same camera.

Thus while it might be possible to computationally compensate for a rotated image if the sensor board was not rotated and the full image area of interest was captured, the need to computationally correct for such image rotation is avoided and images captured by different camera modules, including camera modules rotated at an angle relative to the bottom of the camera device can be easily combined with computational offsetting an image rotation which would be present absent the use of a rotated sensor.

FIG. 10 is a drawing 1000 illustrating the alignment of the optically active area 914 of the image sensor relative to the sensor mounting board 910 in more detail. The optically active area of the sensor 914 is a rectangle with two longer sides 1002, 1002' and two short sides 1004, 1004'. The top side and bottom (base) side of the mounting board 910 indicated by reference numbers 1010 and 1012 respectively. It can be appreciated from the figure that the optically active area of the sensor 914 is aligned such that the longer sides 1002, 1002' of the optically active area of the sensor 914 are at an angle of "θ" with respect to the side 1012 of the mounting board 910 while at an angle of "90°−θ" with respect to the base 1010' of the mounting board 910.

FIG. 11 illustrates a drawing 1100 showing the arrangement of an exemplary sensor 914 on the sensor mounting board 910 in one exemplary embodiment for a specific value of the angle "θ" used in some embodiments. In the illustrated embodiment the angle "θ=36.87°". As shown in the figure, in such a case the diagonal 1102 of the rectangular optically active area of sensor 914 is perpendicular to the base 1010' of the mounting board 910.

In order to allow for a thin camera implementation it may be desirable to use a mirror positioned towards the front of a camera module to redirect light and allow at least a portion of a camera module/optical chain to be oriented so that space between the left and right sides of a camera can be used for a portion of the optical chain. The use of a mirror results in what is sometimes referred to as a folded system. A combination of optical chains some with mirror and others without may result in a useful and desirable configuration for a multi-module camera device where multiple optical chains may be present and used in a single camera device. In such an embodiment, it is often desirable that images captured by different optical chains, e.g., camera modules, be readily combined.

In an imaging system such as a multi-camera, folded system, the images captured by some of the camera modules may have some rotation with respect to another camera module, or some reference scene. This may be due to module positioning within the camera device, mirror orientation issues within particular camera modules and/or due to other reasons. There may also be other additional reasons for such a rotation in the image such as miss-alignment between components during assembly and/or physical mounting issues due to space constraints associated with incorporating multiple camera modules and/or components in a single camera device.

In accordance with the invention, in such cases rotating the sensor of one or more camera modules relative to the camera module body as discussed with regard to FIGS. 9-11, printed circuit board on which the sensor is mounted, can in at least some cases support better capture of the scene of interest by the camera modules including the sensor mounted in what may be considered a rotated position relative to the base of the sensor mounting board.

It should be appreciated that if a sensor corresponding to a camera with a rotationally offset field of view relative to other camera modules were not rotated, the rotationally offset camera sensor would capture a rotated image where some relevant regions of a reference scene/reference camera might be lost due to the offset thereby reducing the usefulness of the captured image for purposes of combining with images captured by other camera modules of the camera.

Thus in accordance with one aspect of some embodiments the optically active area of a sensor, e.g., sensor area 914, of one or more camera modules, of a multi-camera module camera, is rotated at an angle, e.g., theta, cameras discussed above. This rotation compensates for the rotational offset which will occur during image capture. In some embodiments the PCB layout and schematic are accordingly designed with this rotation angle theta in mind where theta is determine on a per module, e.g., optical chain basis. In some embodiments the sensor of an optical chain is placed, bonded and/or mounted within a optical chain housing at this orientation prior to mounting of the optical chain in the body of a camera or on a board of the camera.

Figure 12:
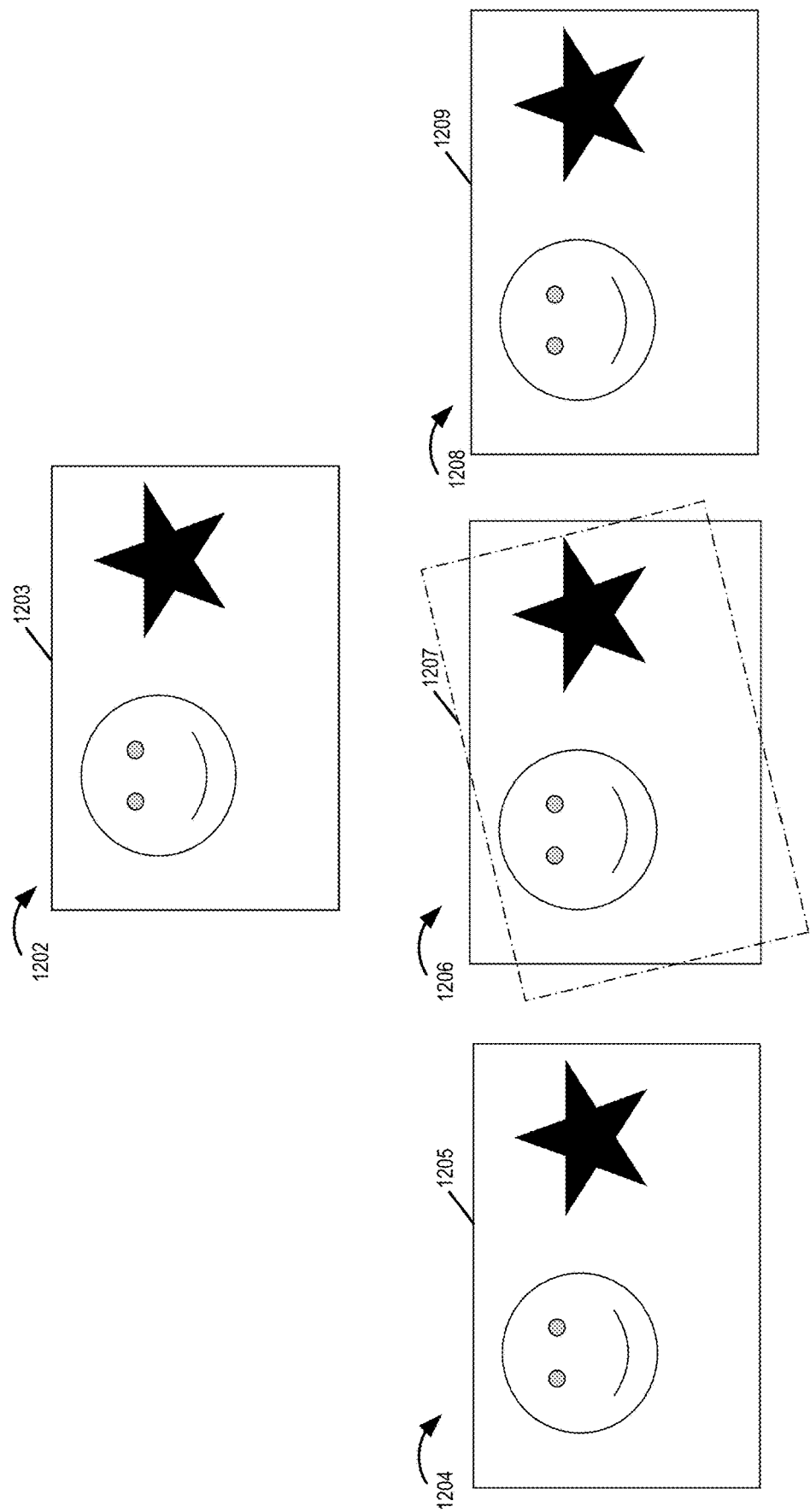
FIG. 12 includes various drawings to facilitate an understanding of the invention.

FIG. 12 includes various drawings to facilitate an understanding of the invention including a drawing 1202 showing a reference scene of interest 1203 which is captured using the multi-camera system of FIG. 3. The drawing 1204 includes an image 1205 of the reference scene of interest 1203 which is an exemplary image captured by a reference camera module such as the forward facing camera module 326, 328, 330, 332 or 334. The drawing 1206 shows an image 1207, illustrated using dashed lines, of the portion of the reference scene 1203 which would be captured by a camera module with a rotational offset if the offset was not compensated for by a corresponding sensor rotation thus showing a case where image capture is performed by one of the camera modules such as camera modules 302, 304, 308, 310, 312, 314, 318, and 320 but without using the rotated sensor configuration shown in FIGS. 9 and 10. It can be appreciated from image 1205 and 1207 (dashed lines) that when the rotational offset is not compensated the captured image 1207 looses a portion, e.g., portion outside the dashed line box, of the scene of interest 1203. Thus it can be appreciated that the image area 1207 looses portions of interest in the scene when compared to the reference image 1205 since portion of the scene area of interest 1203 fall outside the image capture area indicated by the dashed lines. Drawing 1208 shows an image 1209 captured by an exemplary camera module, such as any of the camera modules 302, 304, 308, 310, 312, 314, 318, and 320, that uses a rotated sensor in accordance with the invention. Thus, despite the different mounting arrangement, use of a mirror and rotational offset introduced by the camera module, the reference camera module, e.g., 326, and the rotated camera module, e.g. 302, with the offset compensated sensor alignment both modules will capture the same scene area of interest due the intentional rotation of the sensor in module 302 relative to the sensor mounting board used in the camera module 302.

Numerous additional variations and combinations are possible while remaining within the scope of the invention.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. In some embodiments modules are implemented as logic in a process with different logic being used for each module. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

In some embodiments the processor of a camera is configured to control the camera to implemented the method in accordance with the invention.

While described in the context of an cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

In one exemplary embodiment a camera device includes a first optical chain including a first sensor with a first rectangular image sensing area including a first edge, the first sensor being at least i) mounted on a first printed circuit board with the first edge being rotated at a first angle relative to a first edge of the first printed circuit board or ii) mounted in a first camera module housing with the first edge being rotated at an angle relative to a flat mounting surface of a first camera module housing. In one embodiment of such a camera device the first sensor is mounted in the camera housing and wherein said first edge is a straight edge of the first sensor which is mounted at a non-zero angle relative to the flat mounting surface of said housing. The flat mounting surface of said housing is a top or bottom surface of said first optical chain, said mounting surface being secured to a camera module mounting board in said camera on which at least one other camera module is mounted in some embodiments. In some embodiments the flat mounting surface is mounted in a camera case with the flat mounting surface being secured to a mounting board which extends in a camera case in a plane that is parallel or generally parallel to the back of the camera case. The mounting board maybe and sometimes is a plate to which multiple camera modules are secured which is positioned behind and parallel to the front surface of the camera device.

In some embodiments the first sensor is mounted on a printed circuit board with different camera modules having different circuit boards on which sensors are mounted. In some embodiments the camera device is a single camera module which maybe incorporated into another device. In some embodiments the first optical chain includes a mirror.

In some embodiments the first angle is a non-zero angle less than 90 degrees. In some embodiments the camera device includes multiple optical chains some with mirrors and some with out. In one embodiment the camera device includes at least one additional optical chain which does not include a mirror, said additional optical chain including an additional rectangular sensor with a bottom portion of said additional rectangular sensor extending parallel to the bottom of said camera case. In some embodiments the additional optical chain faces straight out through the face of the camera device and the sensor of the additional optical chain is mounted perpendicular to the sensor of the first optical chain.

In some embodiments the camera device which includes the first optical chain includes a second optical chain including a second sensor with a second rectangular image sensing area rotated at a second angle with respect to the bottom of a second printed circuit board on which the second sensor is mounted, said second angle being different from a first angle at which the first sensor is mounted with respect to said first edge, said first edge being a bottom edge of the first printed circuit board.

In at least some embodiments the camera device includes a camera case including a bottom and the first optical chain includes a mirror with the first optical chain having an optical axis a portion of which is at a non-zero angle relative to the bottom of the camera case; and wherein the camera device further includes a second optical chain which does not include a mirror and which has a second sensor with a bottom edge mounted parallel to the bottom of the camera case. In one such embodiment the camera device further includes a processor configured to generate a composite image by combining a first image of a scene area captured by the first optical chain and a second image of the scene area captured by the second optical chain without performing an image rotation operation on either the first or second images.

Various embodiments are directed to a method of operating a camera device such as the one shown in FIG. 3.

Figure 13:
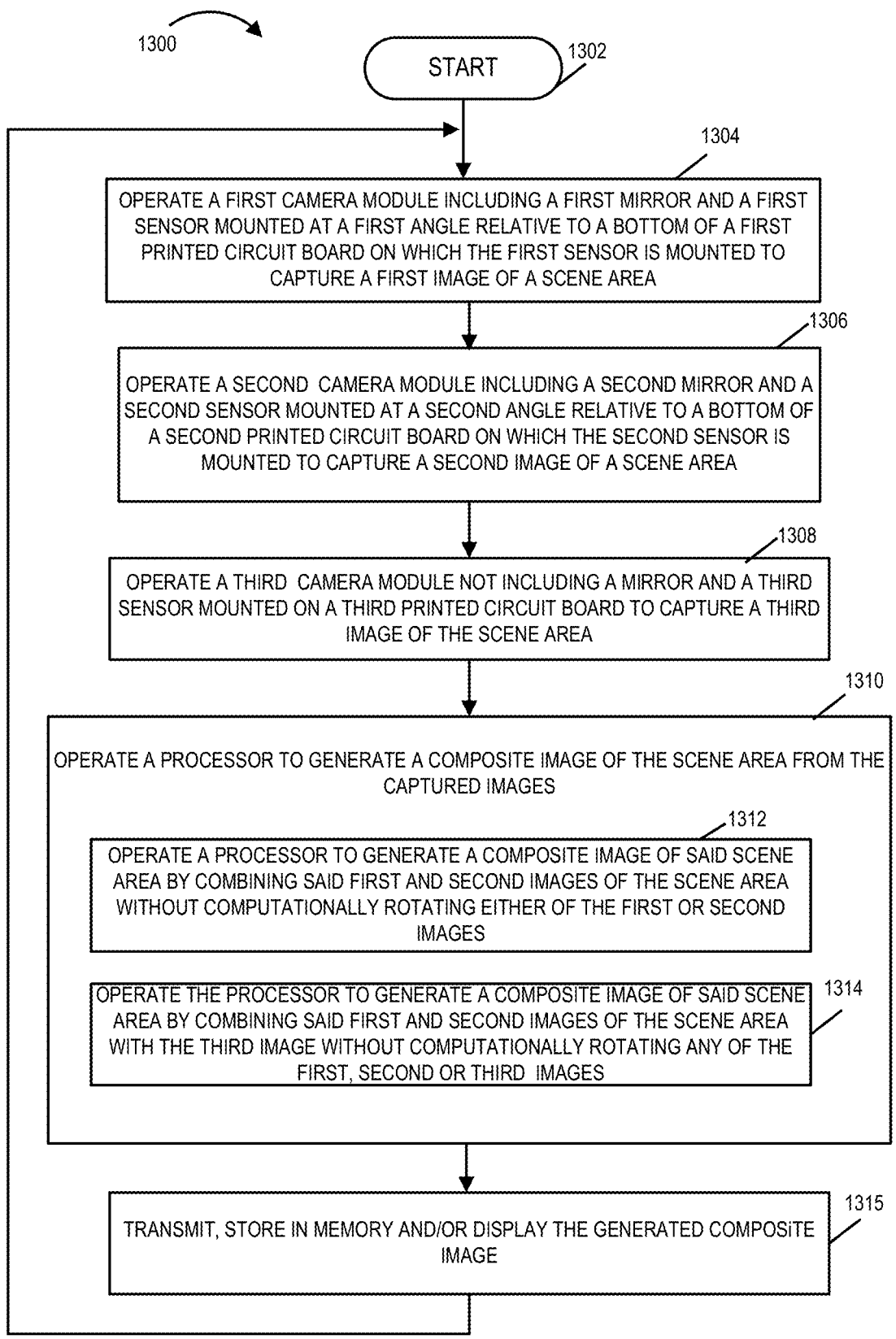
FIG. 13 illustrates an exemplary method of the present invention.

FIG. 13 illustrates the steps of one exemplary method of operating a camera device. The method starts in step 1302 where the processor of the camera device, e.g., camera device 100200 or 300 controls the camera device to implement the method. In step 1304 the processor operates a first camera module, e.g., camera module 310 of camera 300, including a first mirror and a first sensor mounted at a first angle relative to a bottom of a first printed circuit board on which the first sensor is mounted to capture a first image of a scene area. Then in step 1306 the processor operates a second camera module, e.g., module 302, including a second mirror and a sensor mounted at a second angle relative to a bottom of a second printed circuit board on which the second sensor is mounted to capture a second image of the scene area, said second angle being different from said first angle. Then in step 1308 the processor operates a third camera module, e.g., camera module 326 which does not include a mirror to capture a third image of the scene area. In step 1310, under control logic and/or a control routine included in the camera 300, the processor is operated to generate a composite image from the captured images. In step 1312 the processor combines said first and second images to generate a composite image of said scene area without performing a computational rotation operation on either of said first and second images. In embodiments where the third camera module is used to capture a third image of the scene area step 1310 includes step 1314 in which the processor combines said first and second images to generate a composite image of said scene area further includes combining said first and second images with said third image with without performing a computational rotation operation on any of said first, second and third images. Operation proceeds in some embodiments from step 1310 to step 1315 in which the generated composite images is transmitted, stored in memory and/or displayed on the display device of the camera or another display device.

Operation proceeds from step 1315 back to step 1304 where additional images of the scene area, e.g., at a later time, maybe captured for processing in accordance with the method. Thus the return arrow in used to indicate that additional images maybe captured and combined at different times. e.g., based on user input that triggers the image capture and/or method 1300 to be implemented. While the method is explained with regard to 3 camera modules 5, 7 10 or all the camera modules of the camera 300 can and in some embodiments are operated in parallel to capture images and the images are then combined, e.g., in step 1310, to generate a composite image without the need or implementation of a computational rotation of any of the captured images as part of the combining process.

While use of rotated sensors allows the combining to avoid the need for image rotation all implementations need not preclude the rotation of one or more of the images as part of the combining process and some images may be rotated as part of the combining in some embodiments.

In some embodiments of the method the first angle is a non-zero angle less than 90 degrees and the second angel is a second different non-zero angle less than 90 degrees. In some embodiments the first and second camera modules used to implement the method are mounted at an angle relative to the bottom of said camera device and wherein said third camera module is mounted so that the bottom of the third sensor extends left to right in said camera device parallel to the bottom of the camera device.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. An apparatus, comprising:
    a first camera module including a first sensor with a first rectangular image sensing area including a first edge, the first sensor being mounted in a first camera module housing with the first edge positioned at an angle relative to a flat mounting surface of the first camera module housing, said first sensor being mounted on a first printed circuit board, said first printed circuit board having a straight edge extending parallel to the flat mounting surface of said first camera module housing;

wherein said flat mounting surface of said first camera module housing is a top or bottom surface of said first camera module; and wherein said flat mounting surface is secured to a camera module mounting board on which at least one other camera module is mounted.

2. The apparatus of claim 1, wherein said camera module mounting board extends in a camera case in a plane that is parallel or generally parallel to a back of the camera case.

3. The apparatus of claim 1, wherein the first camera module further includes a first mirror.

4. The apparatus of claim 1, wherein said angle is a non-zero angle less than 90 degrees.

5. The apparatus of claim 1, further comprising:
a second camera module; and
a processor configured to generate a composite image by combining a first image of a scene area captured by the first camera module and a second image of the scene area captured by the second camera module without performing an image rotation operation on either the first or second images.

6. An apparatus, comprising:
a first camera module including a first sensor with a first rectangular image sensing area including a first edge, the first sensor being mounted in a first camera module housing with the first edge positioned at an angle relative to a flat mounting surface of the first camera module housing, said first sensor being mounted on a first printed circuit board, said first printed circuit board having a straight edge extending parallel to the flat mounting surface of said first camera module housing; and
an additional camera module which does not include a mirror, said additional camera module including an additional rectangular sensor with a bottom portion of said additional rectangular sensor extending parallel to a bottom of a camera case.

7. The apparatus of claim 6,
wherein the additional camera module faces straight out through the front of the apparatus and wherein the additional rectangular sensor of the additional camera module is mounted perpendicular to the first sensor of the first camera module.

8. The apparatus of claim 6, wherein said flat mounting surface of said first camera module housing is a top or bottom surface of said first camera module.

9. The apparatus of claim 6, wherein the first camera module further includes a first mirror.

10. The apparatus of claim 6, wherein said angle is a non-zero angle less than 90 degrees.

11. The apparatus of claim 6, further comprising:
a processor configured to generate a composite image by combining a first image of a scene area captured by the first camera module and a second image of the scene area captured by the additional camera module without performing an image rotation operation on either the first or second images.

12. An apparatus, comprising:
a first camera module including a first sensor with a first rectangular image sensing area including a first edge, the first sensor being mounted in a first camera module housing with the first edge positioned at a first angle relative to a flat mounting surface of the first camera module housing, said first sensor being mounted on a first printed circuit board, said first printed circuit board having a straight edge extending parallel to the flat mounting surface of said first camera module housing; and
a second camera module including a second sensor with a second rectangular image sensing area rotated at a second angle with respect to a bottom of a second printed circuit board on which the second sensor is mounted, said second angle being different from said first angle.

13. The apparatus of claim 12, wherein said flat mounting surface of said first camera module housing is a top or bottom surface of said first camera module.

14. The apparatus of claim 12, wherein the first camera module further includes a first mirror.

15. The apparatus of claim 12, wherein said first angle is a non-zero angle less than 90 degrees.

16. The apparatus of claim 12, further comprising:
a processor configured to generate a composite image by combining a first image of a scene area captured by the first camera module and a second image of the scene area captured by the second camera module without performing an image rotation operation on either the first or second images.

17. An apparatus, comprising:
a first camera module including a first sensor with a first rectangular image sensing area including a first edge, the first sensor being mounted in a first camera module housing with the first edge positioned at an angle relative to a flat mounting surface of the first camera module housing, said first sensor being mounted on a first printed circuit board, said first printed circuit board having a straight edge extending parallel to the flat mounting surface of said first camera module housing; and
a camera case including a bottom surface;
wherein said first camera module includes a mirror and has an optical axis a portion of which is at a non-zero angle relative to the bottom surface of the camera case; and
wherein the apparatus further includes a second camera module which does not include a mirror and which has a second sensor with a rectangular sensing area with a bottom edge mounted parallel to the bottom surface of the camera case.

18. The apparatus of claim 17, further comprising:
a processor configured to generate a composite image by combining a first image of a scene area captured by the first camera module and a second image of the scene area captured by the second camera module without performing an image rotation operation on either the first or second images.

19. The apparatus of claim 17, wherein said flat mounting surface of said first camera module housing is a top or bottom surface of said first camera module.

20. The apparatus of claim 17, wherein said angle is a non-zero angle less than 90 degrees.

* * * * *